(12) United States Patent
Ahn

(10) Patent No.: US 7,043,868 B2
(45) Date of Patent: May 16, 2006

(54) FISHING ROD STRENGTHENED WITH METAL

(76) Inventor: David Golden Ahn, P.O. Box 441403, Aurora, CO (US) 80044

(*) Notice: Subject to any disclaimer, the term of this patent is extended or adjusted under 35 U.S.C. 154(b) by 0 days.

(21) Appl. No.: 10/249,308

(22) Filed: Mar. 28, 2003

(65) Prior Publication Data

US 2003/0188471 A1    Oct. 9, 2003

Related U.S. Application Data

(60) Provisional application No. 60/369,673, filed on Apr. 3, 2002.

(51) Int. Cl.
*A01K 87/00*    (2006.01)
(52) U.S. Cl. .................... 43/18.1 R; 43/18.5
(58) Field of Classification Search ............. 43/18.1, 43/18.5; D22/142
See application file for complete search history.

(56) References Cited

U.S. PATENT DOCUMENTS

| | | | | |
|---|---|---|---|---|
| 1,748,223 A | * | 2/1930 | Herris ............... | 43/18.1 R |
| 3,421,247 A | * | 1/1969 | Hubbard ............ | 43/18.5 |
| 4,133,708 A | * | 1/1979 | Tokuno ............. | 156/179 |
| 4,178,713 A | * | 12/1979 | Higuchi ............ | 43/18.5 |
| 4,653,216 A | * | 3/1987 | Inoue .............. | 43/18.5 |
| D291,834 S | * | 9/1987 | Matsui ............. | D25/164 |
| 5,665,441 A | * | 9/1997 | Suzue et al. ....... | 428/34.7 |
| 6,048,425 A | * | 4/2000 | Sunaga et al. ...... | 156/173 |

FOREIGN PATENT DOCUMENTS

JP    61182933 A  *  8/1986

OTHER PUBLICATIONS

Fly Fishing Rods, Waders & Gear from ADG, website homepage, www.adgfish.com, Dec. 3, 2004.*
ADGFish Your Specialty Fishing Gear Source, archival webste of Feb. 1, 2001; http://web.archive.org/web/20010201090000/http://adgfish.com.*

* cited by examiner

*Primary Examiner*—Teri Pham Luu
*Assistant Examiner*—Kimberly S. Smith
(74) *Attorney, Agent, or Firm*—Kyle W. Rost

(57) ABSTRACT

A fishing rod is strengthened with a metal reinforcement chosen from a metal coating deposited on a formed rod section and a metal wire in a substantially non-crossing arrangement, or a combination of these. In a base section of the rod, wire is wrapped in a single spiral direction so that the wire substantially does not cross itself. In a tip section, wire is arranged to follow the elongated section in a long spiral or substantially linear path, again not substantially crossing itself. The absence of crossing wires allows improved sensitivity and casting accuracy in the rod and eliminates the potential for crossing wires to separate when the rod flexes.

7 Claims, 5 Drawing Sheets

FISHING ROD STRENGTHENED WITH METAL

CROSS REFERENCE TO RELATED APPLICATIONS

This application claims the priority benefit of U.S. Provisional Patent Application 60/369,673 filed Apr. 3, 2002, abandoned.

BACKGROUND OF INVENTION

1. Field of the Invention

The invention generally relates to stock material suited for constructing a hollow type of article such as a fishing rod. More specifically, the invention relates to a rod like article constructed in part of a polymer or resin and coated with metal deposited on a rod section or joined to a metal wire incorporated into a rod section, or combinations of these.

2. Description of Related Art including Information Disclosed under 37 CFR 1.97 and 1.98

Fishing rods desirably are constructed to be light in weight, strong, flexible, and sensitive to transmission of motion. These goals are difficult to achieve in a single construction, and there is a continued need to improve any of these characteristics without sacrificing the others. As an example of how light in weight a modern fishing rod can be, a state-of-the-art fly fishing rod of nine-foot length can be made to weigh less than three ounces, excluding the reel. The other characteristics are difficult to quantify, but each rod displays a different mix that the fisherman tries to evaluate when selecting a rod.

Current construction practice favors a molding process that uses a, pre-preg material, which is a sheet of fibrous material containing resin that can be cured, thermally or otherwise. Common pre-preg materials are sheets of fiberglass or graphite fibers. The pre-preg material is wrapped around a mandrel, often a tapered mandrel, to assume the shape of the desired rod section. The wrapped material is placed under pressure by application of a temporary top layer, which may be a special tape. The covered pre-preg then is cured in an oven. After curing, the temporary covering layer and the mandrel are removed to produce a lightweight, hollow rod section. The surface of the rod section can be smoothed by sanding to remove any irregularities and to produce a surface gloss as may be desired. A rod section produced by this process is very light in weight and has considerable strength and flexibility.

There are many variables in the process, such as the selection of pre-preg material, the number of wraps on the mandrel, the selection of resin, and the optional use of additional coatings or material layers. Several patents have taught specific structures and combinations of materials in attempts to produce a strong, lightweight rod with good rod action. U.S. Pat. No. 5,381,619 to Watkins suggests that the rod can be formed entirely of materials such as fiberglass, boron, graphite, or titanium. U.S. Pat. No. 5,601,892 to McIntosh suggests using an inner layer of graphite fibers and an outer layer of nickel coated graphite fibers, wherein the fibers are coated prior to being formed into a pre-preg mat. U.S. Pat. No. 5,665,441 to Suzue et al. suggests wrapping a layer of perforated sheet metal in a resin layer on top of the pre-preg layer. U.S. Pat. No. 5,698,055 to Benkoczy suggests adding a braided fiber sleeve to pre-preg layers. The sleeve can be added under, over, or between layers of the pre-preg. U.S. Pat. No. 5,997,970 to You suggests adding fibers in a pattern having part braided and part linear. Such fibers can be carbon, boron, glass, titanium, or other trademarked fibers known by the names Dyneema or Kevlar.

The addition of a binding or braided layer over a molded pre-preg is known to provide extra strength, although the strength may be achieved with a loss of sensitivity. Braiding tends to increase rigidity and decrease sensitivity. A further problem is that a braided layer calls for the elements or wires forming the braid to be of slightly different length at each intersection of crossing elements. This difference is inevitable because the elements of one layer will pass over or under the elements of the other at each intersection. The elements may be incorporated into the pre-preg or encased in a resin layer. In either case, the elements substantially cannot move with respect to the pre-preg or resin layer that holds them, increasing the rigidity of the rod. Yet, the length difference at the crossing points requires movement or change of length in one layer or the other whenever the rod flexes and bends, which is a frequent event during fishing. Some materials, such as fibers, may be forgiving enough to permit at least some flexing or bending without damaging the pre-preg or resin layer. Other materials, such a metal wires, may be less forgiving and may create an undesirable friction or tendency to move and separate the wires at the braided or crossed area.

The undesirable friction or movement can result in any of several conditions. First, any actual separation of crossing wires can damage the pre-preg or resin layer. Such separation can render the fishing rod useless. Second, the undesired forces generated in the braided areas can produce inconsistent rod action. For example, a rod may be inaccurate even in the hands of the experienced fisherman.

In certain critical areas of a rod, crossed braid elements can produce unexpected weakness leading to breakage or loss of rod action. Fishing rods narrow or are tapered from a relatively wide butt section to a relatively narrow tip section at the opposite end from the butt. At its extreme end or tiptop opposite from the butt section, the tip carries an end guide hood from which the fishing line extends free of the rod. The tip section and guide hood are considered critical elements of the rod, as it is the more flexible and sensitive end element that bears much of the force as the rod is used to cast the line or land a fish. The braid can occupy an overly large proportion of this narrower section of the rod. Moreover, at the terminal end of the tip, the proportion of braid still further reduces the amount of graphite, fiberglass or other pre-preg material where the guide hood is engaged. This deficiency of pre-preg material has the potential to weaken the tip section, especially at the guide hood. This can reduce the rigidity and resiliency at the tip and reduce in rod action.

It would be desirable to have the strengthening qualities of a braided wrap with reduced possibility that the rod will suffer failure due to separation of crossing braid elements. Further, it would be desirable to maintain or improve the action of a tip section and prevent undue loss of the pre-preg material throughout the tip section and especially at the tiptop or guide hood.

To achieve the foregoing and other objects and in accordance with the purpose of the present invention, as embodied and broadly described herein, the method and apparatus of this invention may comprise the following.

SUMMARY OF INVENTION

Against the described background, it is therefore a general object of the invention to strengthen the pre-preg material of a fishing rod without introducing the hazards associated with crossed braid structures.

Another object is to strengthen the pre-preg material in the tip section of a fishing rod without overly reducing the proportion of pre-preg material in the tip section and at the guide hood.

In general, the invention provides a fishing rod in which the pre-preg material is strengthened, and its action improved, by addition of a metal layer that does not readily separate between its own elements.

According to one sub-embodiment of the invention, an improved fishing rod is formed of at least one butt section and one tip section, whether embodied in a unitary rod section or multi-part rod. The butt section is reinforced by addition of a metal wire, which may be referred to as a butt wire. The butt wire may be arranged along a longitudinal path generally following the longitudinal axis of the butt section. The butt wire preferably is spiral wound with respect to the longitudinal axis of the butt section. Such a spiral wound wire is arranged to form a spiral extending in a single direction so that it does not cross itself.

The pre-preg material of the tip section also is strengthened and made sensitive by a metal wire, which may be referred to as a tip wire. The tip wire generally follows the longitudinal axis of the tip section. The tip wire may be linear, or it may follow a non-linear or spiral path. The path of the tip wire is preferred to be linear or a longer spiral than used in the butt section. In either section, a key feature is that the wire substantially does not cross itself, whereby the wire will not create a crossing feature prone to weakness or failure.

According to a second sub-embodiment of the invention, an improved fishing rod is formed by pre-preg construction, and the pre-preg material of a formed rod section is coated with a substantially continuous layer of metal. As examples, the rod section may be coated by suitable methods of vapor deposition or solvent deposition of a metal layer. Such a metal or metalized layer is extremely thin, as is known for a layer formed by plating or deposition methods. Thus, the layer is thin, flexible, and light in weight. The metal layer is applied over the formed pre-preg material of a rod section so as to form a continuous layer at least substantially from end-to-end of one or more rod portions of a multi-portion rod. Such a deposited coating is especially suitable on the tip section of a multi-portion rod. Alternatively, such a coating may be applied to an entire rod, a selected partial length of a rod, or rod portion.

According to a third sub-embodiment of the invention, a rod or rod portion may be enhanced by metal wire, described above, and a metal layer, described above. The two types of metal enhancement may be applied to separate portions of a rod or both may be applied to one or more common portions of a rod.

The fishing rod of the invention includes a longitudinally elongated first rod section that is formed of pre-preg material configured into a rod shape. A first metal component is applied to the pre-preg material of the first rod section. The metal component may be any combination of a metal coating applied by a deposition process after the pre-preg material has been configured into the rod shape, or a metal wire arranged in a substantially non-crossing arrangement. The metal component extends substantially continuously over the length of the first rod section.

The invention includes a method of forming a fishing rod. First, a mat of pre-preg material is formed into a longitudinally elongated rod structure. Second, a metal component is applied to the formed rod structure by any combination of two techniques. In one technique, a metal coating is applied by a deposition process after the pre-preg material has been formed into the rod structure. In the second technique, a metal wire is applied in a substantially non-crossing arrangement to the length of the formed rod structure. The metal component is applied substantially continuously over the length of the rod structure.

The accompanying drawings, which are incorporated in and form a part of the specification, illustrate preferred embodiments of the present invention, and together with the description, serve to explain the principles of the invention. In the drawings:

DETAILED DESCRIPTION

Figure 1:
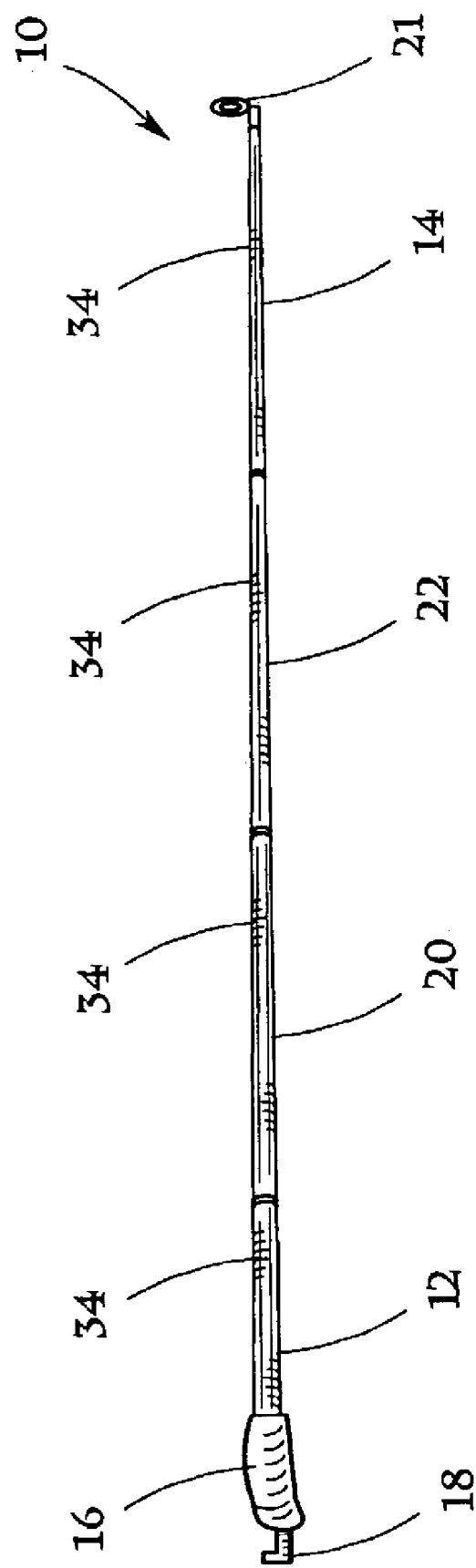
FIG. 1 is an isometric view of a fishing rod.

With reference to FIG. 1, a fishing rod 10 is formed as a one-piece rod or as a rod formed from multiple rod subsections. In either case, the rod may be viewed as including definitional sub-portions, which are identified as at least one butt section 12 and one tip section 14. In many cases, these definitional subsections also are physically separate, interconnectable rod portions. The butt section generally has a relatively greater diameter or other width measurement. The butt section may be a single interconnectable portion or multiple portions, including the proximal section joined to a handle 16 and reel seat 18. In a typical nine foot long fly rod formed of four sequentially connectable sections, the butt section may refer to the two juxtaposed wider sections 12 and 20 nearer the handle. The tip generally is the relatively narrower portion, section, or sections, including the distal section carrying the guide hood 21 at the tip of the rod opposite from the handle and reel seat. In the typical nine foot fly rod formed of four sequentially connectable sections, the tip section may refer to the two juxtaposed narrower sections 14 and 22, both of which are narrower than either of the butt sections. For purposes of the invention, the longitudinal length of a rod will refer to the portion of a rod from the tip 21 to the handle 16, but not necessarily including the handle.

Figure 3:
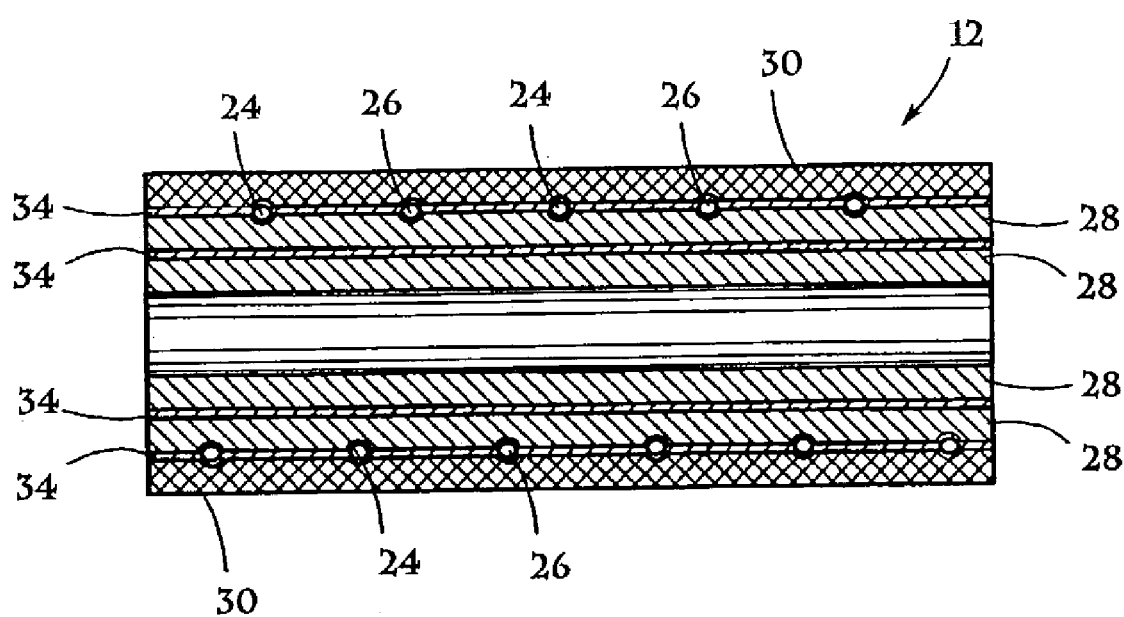
FIG. 3 is a longitudinal cross-section of a fragment of the rod section of FIG. 2.

A fishing rod 10 is formed of pre-preg material molded into a desired hollow rod shape. The pre-preg material is wound in layers 28, better shown in FIG. 3. The invention provides a strengthening metal layer or continuous metal element that improves the sensitivity of the rod while maintaining a light weight for the rod. The continuous metal element may extend from tip 21 to handle 16, not necessarily extending through the handle. The metal is preferred to be titanium.

A deposited metal layer 34 coats one or more pre-preg layers 28 of a formed rod section, which may refer to an entire rod length or a limited portion such as a base section 12 or any other subsection or combination of subsections. Various techniques are known for applying, plating, or depositing a thin metal layer over a rod of pre-preg material. By way of example and not limitation, these methods include vapor deposition, electro deposition, and solvent deposition. A metallic layer 34 may be applied over more than one pre-preg layer 28, where multiple pre-preg layers are used. A deposited metal coating is especially desirable on the tip section 14, FIG. 4, where other coatings such as wire wraps may be undesirably bulky.

The metal coating 34 is preferred to be substantially longitudinally continuous over the length of a rod 10. The coating forms a continuous or substantially continuous surface of a rod 10 or a rod subsection 12, 14, 20, 22. The continuity of the coating is beneficial both for strengthening the rod and for creating a high sensitivity or sensitive feel through the length of the rod. The sensitive feel is transmitted to handle 16. For this reason, it is not necessary that the coating extend through or proximally nearer than the handle. Non-coated areas may occur but are to be minimized. Breaks in the continuity of the coating are most acceptably when located in a stiff portion of the rod, such as near connection fittings between subsections. The coating may be continuous over the full length of pre preg material in a rod subsection and may extend into connection fittings.

A deposited coating may be applied to a rod section after the pre-preg material is formed, molded, cured and sanded. Where a metal-coated rod section also is reinforced with wire as described below, the wire preferably is applied before the rod section is coated with deposited metal. In such a case, the wire also is coated by the metal layer and may be incorporated into the metallic coating layer. However, the metal coating may be applied first and the wire applied second. A top coating 30 of resin may be applied over the metal coating, or the coating can be covered by additional pre-preg material, as suggested by the coating layers 34 indicated at the interfaces of various layers in FIG. 3.

Figure 2:
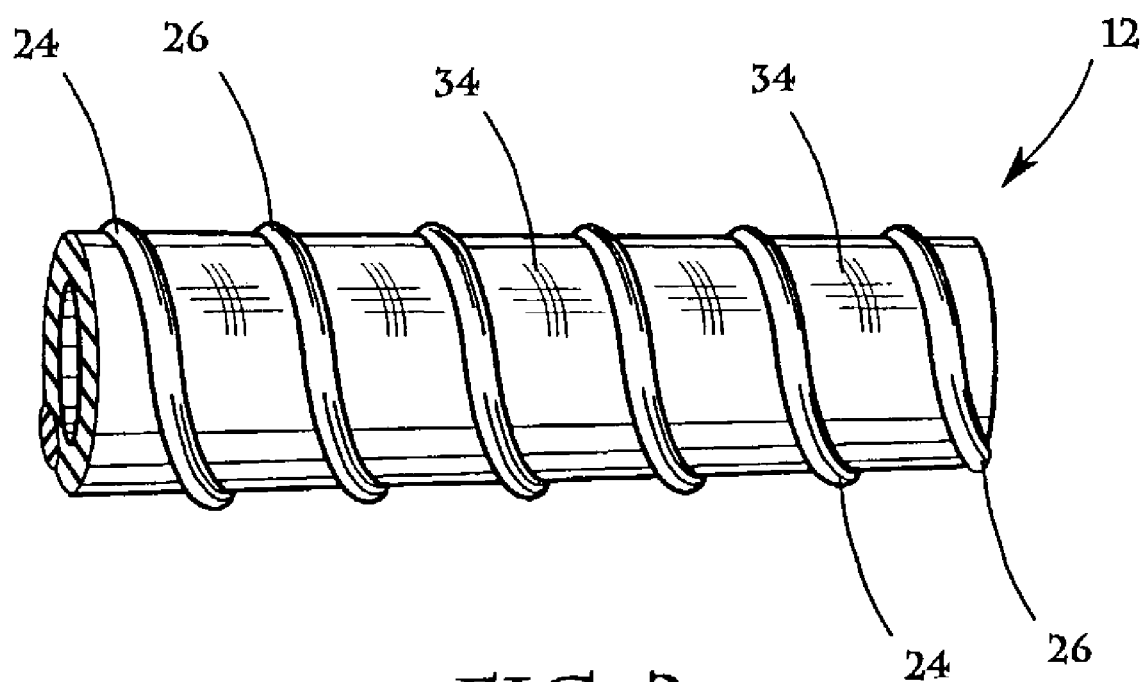
FIG. 2 is an isometric view of a fragment of the rod with spiral wire coating applied.

As shown in FIG. 2, a rod 10 or rod section such as butt section 12 carries a spiral wrapped metal wire 24, preferably of titanium. The spiral extends in a single spiral direction around the rod section. Two or more wires 24, 26 may be wound around the rod section, but they are wrapped at similar angles in a single direction so that the wires do not cross. With reference to the preferred arrangement of FIG. 3, the wire is wrapped on a rod section 12 before curing the pre-preg layers 28. As a result, wires 24, 26 are incorporated or embedded into the pre-preg during the cure. Thus, the wire should not be abraded during the finish sanding of cured rod sections. An alternative method of applying the wire is after the rod is sanded. A top coating 30 of resin may be applied over the wire, or the wire can be covered by additional pre-preg material. The spiral provides helix coil action in the rod sections where it is applied.

Figure 4:
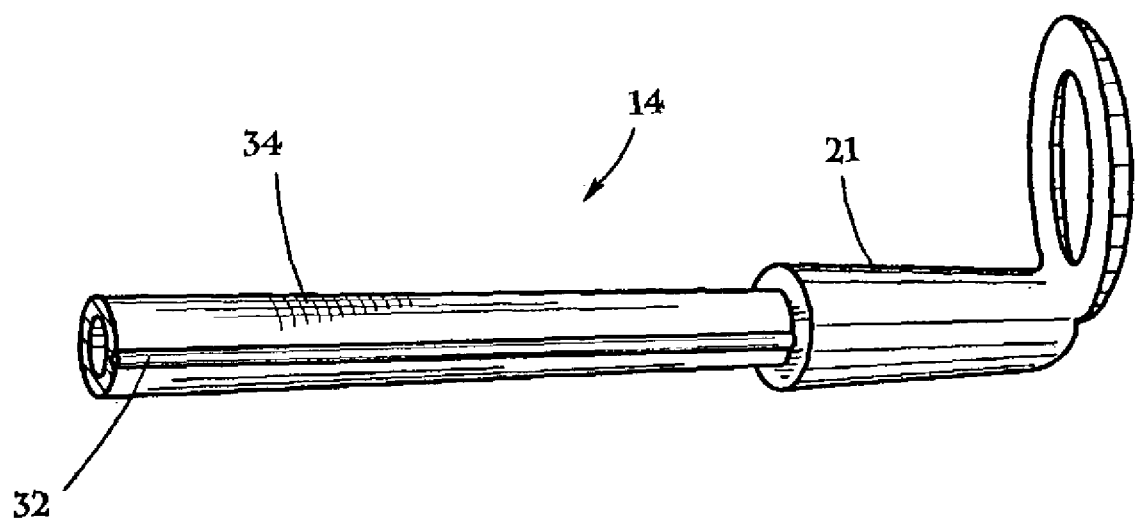
FIG. 4 is a fragmentary isometric view of a rod section with linear wire coating applied.

FIG. 4 shows another pattern for applying wire to a rod or rod section. For example, the tip section 14 of the rod carries one or more generally straight or linear metal tip wires 32 arranged approximately parallel to or generally following the longitudinal axis of the rod section. A single wire 32 lying along one edge of tip section 14 is offset from the longitudinal axis of the pre-preg material of the second rod section and creates a side portion of differing flexure as would follow from the presence of metal wire so located in pre-preg material of the second rod section. Where the rod section is a tip section 14, the tip wire enters guide hood 21. In a tapering tip section, the linear wire may follow the taper of the surface. If desired, rather than being straight, the wire may form a spiral as shown in FIG. 2. However, the spiral length of a tip wire 32 may be relatively longer than the spiral of a butt wire. It is generally desirable that the guide hood 21 covers less than one spiral of a tip wire, which provides guidance for a preferred spiral length through the tip section 14.

Figure 5:
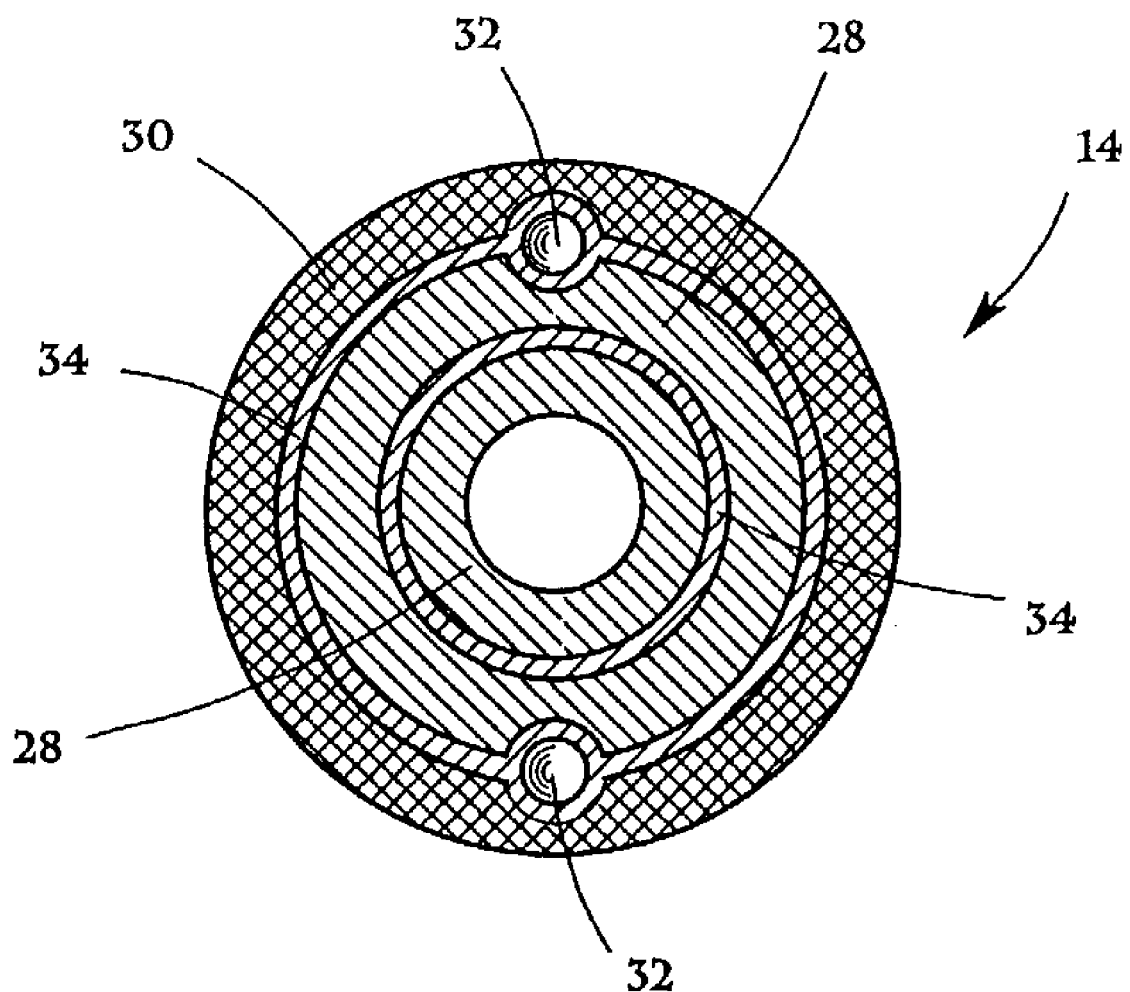
FIG. 5 is a transverse cross-section of a rod section of FIG. 4.

With reference to FIG. 5, the tip wire 32 is applied to the tip pre-preg material 28 prior to curing so that the wire is incorporated or embedded into the pre-preg during the cure. An alternative method of applying the linear wire is after the rod tip is sanded. As with treatment of the butt section, the tip wire 32 may be covered by a resin coat 30 or additional pre-preg material. A metal coating 34 may be applied to any layer of the pre-preg material, with or without usage of a corresponding tip wire 32, and either before or after application of a tip wire 32, when such a tip wire is used. If two or more tip wires 32 are used on a tip section, they should be arranged in a non-crossing pattern relate to each other. The tip wire provides linear action in the tip section.

The pre-preg material 28 used to form the rod may be fiberglass, graphite, graphite composite, or other fiber suitable for use in a fishing rod. The wire 24, 26, 32 used in the spiral wrap or linear application is preferred to be titanium wire, although other metals or reinforcing materials may be used. Titanium also is the preferred material for use as a deposited coating.

Wire reinforcement is applied either to the full length of the rod or to a substantial part of it. The use of spiral wrapped wire on the butt and linear wire on the tip improves the action of the rod. The rod has improved accuracy for casting, as well as improved flexibility, sensitivity, and strength. The wire patterns provide advantages found with braided wires while eliminating wire separations and eliminating excessive weakening in the tip section 14. The disclosed wire patterns substantially eliminate braiding or crossing wires. Of course, in certain areas of a fishing rod, a nominal crossing or braiding may be of little consequence. The presence of a nominal or token crossing is considered to fall within the aspect of this invention involving providing wire in the butt section and tip section that substantially does not cross.

The use of a thin, deposited metal layer 34, either in combination with wire 32 or as an alternative to it, also provides improved rod action. A deposited coating of metal is both thin and flexible. Unlike prior art teachings that wrap a pre-preg layer with a pre-formed sheet metal layer, the deposited coating does not readily separate from the rod during use. Unlike prior art teachings to use fibers pre-coated with metal to form the pre-preg mat, a deposited surface metal coating on the formed rod section or a pre-preg layer within it provides longitudinal continuity in the metal layer and produces a sensitive rod with good rod action.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be regarded as falling within the scope of the invention as defined by the claims that follow.

The invention claimed is:

1. A fishing rod, comprising:
   a longitudinally elongated first rod section formed of pre-preg material configured into a rod shape, wherein the first rod section is a base section of the fishing rod, juxtaposed to a rod handle;

a first metal wire component arranged in a substantially non-crossing spiral arrangement applied to said pre-preg material of said first rod section;

a cover layer covering said first metal wire component of the pre-preg material;

wherein said first metal wire component extends substantially continuously over the length of the first rod section and is thermally cured to the first rod section between the pre-preg material and said cover layer covering the first metal wire component;

a longitudinally elongated second rod section longitudinally aligned with the first rod section and formed of pre-preg material configured into a rod shape, wherein said second rod section is a tip section of the fishing rod and is of relatively narrower transverse dimension than the first rod section;

a second metal wire component cured to the pre-preg material of the second rod section, extending substantially continuously over the length of the second rod section, and arranged in an offset position from a longitudinal axis of the pre-preg material of the second rod section and disposed with respect to said longitudinal axis such that it creates a predictable longitudinal side of the second rod section of differing flexure from remaining longitudinal side portions of the second rod section.

2. The fishing rod of claim 1, wherein said first metal wire component comprises titanium metal.

3. The fishing rod of claim 1, wherein:
said second metal wire component consists of one wire arranged with respect to said second rod section in a linear pattern.

4. The fishing rod of claim 1, wherein said first metal wire component comprises plural wires arranged with respect to said first rod section in a spiral pattern.

5. The fishing rod of claim 1, wherein said first metal wire component is applied to an outer surface of said pre-preg material.

6. A fishing rod, comprising:
a longitudinally elongated first rod section formed of pre-preg material configured into a rod shape;

a second rod section longitudinally aligned with said first rod section and formed of pre-preg material configured into a rod shape;

a first metal wire component thermally cured in a substantially non-crossing spiral pattern to said pre-preg material of said first rod section, wherein said first metal wire component extends substantially continuously over the length of the first rod section; and a second metal wire component consisting of one wire thermally cured to the pre-preg material of said second rod section and arranged with respect to said second rod section in a linear pattern, wherein said one wire extends substantially continuously over the length of the second rod section.

7. The fishing rod of claim 6, wherein:
said first rod section is a base section of the fishing rod, juxtaposed to a rod handle; and said second rod section is a tip section of the fishing rod and is of relatively narrower transverse dimension than said base section.

* * * * *